(12) United States Patent
Markut (10) Patent No.: US 12,203,717 B2
(45) Date of Patent: Jan. 21, 2025

(54) BOLT HEAD FOR A FIREARM

(71) Applicant: GLOCK TECHNOLOGY GMBH, Ferlach (AT)

(72) Inventor: Karl Markut, Klagenfurt (AT)

(73) Assignee: GLOCK TECHNOLOGY CMBH, Ferlach (AT)

( * ) Notice: Subject to any disclaimer, the term of this patent is extended or adjusted under 35 U.S.C. 154(b) by 62 days.

(21) Appl. No.: 17/754,209

(22) PCT Filed: Sep. 30, 2020

(86) PCT No.: PCT/EP2020/077375
§ 371 (c)(1),
(2) Date: Mar. 26, 2022

(87) PCT Pub. No.: WO2021/064024
PCT Pub. Date: Apr. 8, 2021

(65) Prior Publication Data
US 2022/0325967 A1 Oct. 13, 2022

(30) Foreign Application Priority Data

Oct. 4, 2019 (EP) ..................................... 19201453
Nov. 25, 2019 (EP) ..................................... 19211234

(51) Int. Cl.
*F41A 3/30* (2006.01)
*F41A 21/12* (2006.01)
*B33Y 80/00* (2015.01)

(52) U.S. Cl.
CPC ................ *F41A 3/30* (2013.01); *F41A 21/12* (2013.01); *B33Y 80/00* (2014.12)

(58) Field of Classification Search
CPC ................................................... F41A 3/12–52
(Continued)

(56) References Cited

U.S. PATENT DOCUMENTS 3,791,256 A * 2/1974 Curtis ....................... F41A 9/41
89/185
5,722,194 A * 3/1998 Wurger ..................... F41A 3/20
42/69.02

(Continued)

FOREIGN PATENT DOCUMENTS

| DE | 202015000216 U1 * | 4/2015 | ............... F41A 3/26 |
| EP | 0869326 A2 | 10/1998 | |
| EP | 3800431 A1 | 4/2021 | |

OTHER PUBLICATIONS

International Search Report for PCT/EP2020/077375, dated Dec. 23, 2020.

*Primary Examiner* — Bret Hayes
(74) *Attorney, Agent, or Firm* — Raven Patents, LLC; Anton E. Skaugset (57) ABSTRACT

Firearms and bolt carriers having a bolt head including a bolt head axis and a plurality of locking lugs, wherein at least two recesses having a radius, measured with respect to the bolt head axis, are formed on the bolt head between at least two adjacent locking lugs. To improve the guidance of the bolt head, at least two centering ramps, which are designed obliquely to the bolt head axis and protrude in the axial direction toward the rear up to a central radius that is greater than the radius, for self-centering the bolt head during the bolt process are formed in the region of the recesses.

26 Claims, 8 Drawing Sheets

(58) Field of Classification Search
USPC ......... 89/180–183, 187.01, 187.02, 188–190
See application file for complete search history.

(56) References Cited

U.S. PATENT DOCUMENTS

| | | | |
|---|---|---|---|
| 8,387,513 B2 | 3/2013 | Gomez | |
| 9,234,713 B1 | 1/2016 | Olson | |
| 10,036,600 B2 | 7/2018 | Maranli | |
| 2012/0137869 A1* | 6/2012 | Gomez | F41A 5/18 |
| | | | 89/125 |
| 2014/0090283 A1 | 4/2014 | Gomez | |
| 2015/0308759 A1* | 10/2015 | Fellows | F41A 15/14 |
| | | | 42/16 |
| 2016/0033226 A1* | 2/2016 | Potter | F41A 3/30 |
| | | | 42/76.01 |
| 2018/0142972 A1* | 5/2018 | Overstreet | F41A 19/30 |
| 2021/0108870 A1* | 4/2021 | Underwood | F41A 3/46 |

\* cited by examiner

BOLT HEAD FOR A FIREARM

TECHNICAL FIELD

The present disclosure relates to firearms, and more particularly, to a bolt head for a firearm that allows automatic centering of the bolt in the locking space of a barrel during the locking process.

RELATED APPLICATIONS

The application claims the priority of the applicant's European patent application "one-piece barrel," EP19201453.8, the contents of which are made part of the present application for the jurisdictions in which this is possible.

BACKGROUND

Throughout the description and claims, "forward" or "(toward) the front" is used as the direction toward the muzzle of the barrel, "(toward) the rear" is used as the direction toward the shaft, "(toward) the bottom" is used as the direction for the bolt toward the magazine, and "(toward) the top" is used as the direction away from the magazine. The terms "weapon median plane," "barrel bore," "barrel axis," "bore axis," etc. have the usual meaning that those skilled in the art attach to them in the prior art. Thus, the bolt moves "backward" under the effect of the gases after a shot is fired and returns "forward" under the effect of a return spring, etc. This also applies to information relating to the bolt head axis. Surfaces "parallel" to an axis form cylindrical outer surfaces and "recesses" refer to surrounding regions of the object under consideration, etc.

Bolt heads are manufactured and sold as individual parts, and in each case their outer dimensions and their parts that cooperate with parts of the weapon are geometrically and functionally adapted to the weapon in which they are intended for use.

In semi-automatic and automatic firearms having a rotating bolt, such as in M4/M16 or AR-15-based systems, the (semi-)automatic reloading is done by moving the bolt back and forth. During the backward movement, the bolt slides over the magazine toward the rear in the direction of the shaft and is subsequently usually moved forward again by the spring force of a return spring. When moving forward, the bolt head carries along the uppermost cartridge, which has, in the meantime, been pushed upward and in part into the path of the bolt by the magazine, in its movement toward the muzzle (front) and pushes said cartridge out of the magazine and into the cartridge chamber via a feed ramp.

Locking lugs of the bolt head move forward into a locking space through corresponding recesses of a locking sleeve, also known as barrel extension. The forward movement of the bolt head movably mounted in the bolt carrier, forcibly ends due to the abutment of the cartridge case in the cartridge chamber. Then, as a result of the further forward movement of the bolt carrier, a rotational movement of the bolt head forced by the interaction of a cam pin and a cam surface takes place, as a result of which the bolt is locked by means of the locking lugs.

The unlocking and opening of the bolt after firing takes place by means of the reverse movement sequence, which, in gas-operated weapons, is induced, for example, by the high energy of the gas pressure.

Due to the general clearance that is necessary between the movably mounted parts, the ideally completely centric movement of the bolt head can deviate from the ideal state and, to some extent, be acentric. Particularly in the field or during automatic firing, contaminations, oscillations, shaking, vibrations and/or other influences can be the reason that the movement of the bolt head parallel to the bore axis of the barrel takes place acentrically in the locking space and that, for example, tilting occurs.

The locking process and subsequently the automatic reloading is thus made more difficult. For example, this can cause the bolt head to strike the step that exists between the bayonet-type groove and the locking space. This can make it difficult to aim the weapon or lead to loading and/or feed jams of the firearm. Furthermore, the acentric movement of the bolt head causes premature wear and thus reduces the service life of the affected components.

Weapons having a bolt head having straight locking lugs and a fully continuous cam pin are known from the prior art. Machining by means of machining processes leads to relatively sharp edges, for example, of the locking lugs. Stepped versions of the regions directly after the locking lugs to the rear are also known. Sharp edges on the locking lugs of the bolt head can, given a slightly acentric movement of the bolt head, lead to impacting or striking the lugs of the locking sleeve of the barrel/cartridge chamber when the bolt head moves in and out, and catching can even occur sometimes. As a result, the automatic loading process is adversely affected and jams may occur. Furthermore, the material is unnaturally stressed by the impacting and striking and is exposed to premature wear and fatigue.

U.S. Pat. No. 8,387,513 B2 discloses asymmetric locking lugs of complex geometry that have an oblique or wedge-shaped profile. However, the chamfer of the locking lugs makes a small stop surface necessary, which is disadvantageous for empty closing, i.e., without a cartridge. Due to the complex geometry of the locking lugs, complex and costly production is required. The two lower locking lugs in the region of the cartridge feed from the magazine are normal to the bolt head axis.

U.S. Pat. No. 9,234,713 B1 discloses a bolt head having locking lugs that are beveled toward the rear. The two lower locking lugs facing the magazine are offset to the rear and designed so as to be normal to the bolt head axis to carry along the cartridges more easily. The complex and thus costly production of the bolt head and the counterpart locking chamber/cartridge bearing act have a disadvantageous effect. A centering of the bolt head and thus of the cartridge takes place only during the locking process, i.e., after the bolt head has reached the end position and is rotated about the longitudinal axis.

A further disadvantage in the prior art is that the cam pin is, in the installed state, positioned transversely (normal) to the bolt head axis in a corresponding through hole in the bolt head. Like the bolt head itself, the cam pin has a bore for the firing pin in the direction of the bolt head axis and is kept in position and prevented from falling out of the bolt head and/or from falling through downward by said firing pin, which is situated in these same bores. The diameter of the cam pin, which is relatively large compared to the bolt head, results in a correspondingly large radial through hole in the bolt head. Due to the relatively small remaining wall thickness, this design leads to a weakening of the bolt head in the region of the cam pin. In practice, cracks of the bolt head occur in this region and unintentionally shorten the service life of the bolt head.

Furthermore, due to the movement of the bolt head relative to the bolt carrier and the consequent interaction of the cam pin with the cam in the bolt carrier, noticeable transverse forces occur. These transverse forces initially act on the cam pin and are subsequently transmitted to the bolt head, as a result of which the bolt head completes the rotary movement necessary for locking and unlocking. In particular, very strong forces occur when the bolt is opened. After the bolt carrier is greatly accelerated in its backward movement and the bolt has already been opened, the bolt carrier or the end of the cam strikes the cam pin and accelerates said cam pin together with the bolt head correspondingly greatly and quite abruptly. Of course, this pulse is accompanied by a corresponding material load.

U.S. Pat. No. 10,036,600 B2 discloses a bolt head having a shortened cam pin that is located in a downwardly closed blind hole. The shortening of the cam pin, however, disadvantageously entails a shorter lever and a reduced area for the force transmission and results in an increased material load both on the cam pin and on the bolt head.

In principle, a slightly acentric movement of the bolt head movable in the bolt carrier can occur, for example, due to contamination, oscillation, rattling, vibration and/or other influences, in particular during the automatic reloading process. This acentric movement can be enhanced, for example, by the so-called "carrier tilt," a kind of "catching" in the rear region of the bolt carrier movable in the upper receiver. In addition, this acentric movement can also be stimulated by undesirable addition of the inherently necessary clearance for the movement of the bolt head in the bolt carrier and for the movement of the bolt carrier in the upper receiver.

The content of U.S. Pat. No. 8,387,513 B2, U.S. Pat. No. 9,234,713 B1 and U.S. Pat. No. 10,036,600 B2 is hereby incorporated by reference, for any and all purposes.

What is needed is an improved bolt head that avoids the disadvantages mentioned in the prior art as completely as possible. The present disclosure provides such an optimally-shaped, reliable, low-wear and long-life bolt head, as well as a cost-effective production process.

SUMMARY

The present disclosure is directed to a bolt head for a firearm that allows automatic centering of the bolt in the locking space of a barrel during the locking process, and also allows improved force absorption of the cam pin.

In one example, the disclosure includes a bolt head for a firearm having a bolt head axis and a plurality of locking lugs, the bolt head defining at least two recesses between at least two adjacent locking lugs, the at least two recesses having a recess radius as measured with respect to the bolt head axis; where the bolt head defines at least two centering ramps formed in a region of the at least two recesses so that the centering ramps extend obliquely to the bolt head axis and extend in an axial direction toward a rear of the bolt head up to a central radius that is greater than the recess radius, such that the at least two centering ramps aid in a self-centering of the bolt head during a locking process.

In another example, the disclosure includes a bolt carrier for a firearm, having a bolt head having a bolt head axis, a plurality of locking lugs, and a cam pin; where the bolt head defines at least two recesses between at least two adjacent locking lugs, the at least two recesses having a recess radius as measured with respect to the bolt head axis; the bolt head defines at least two centering ramps formed in a region of the at least two recesses so that the centering ramps extend obliquely to the bolt head axis and extend in an axial direction toward a rear of the bolt head up to a central radius that is greater than the recess radius, such that the at least two centering ramps aid in a self-centering of the bolt head during a locking process; and the cam pin includes at least one step at an end to be inserted into the bolt head.

In another example, the disclosure includes a firearm having a bolt carrier, where the bolt carrier includes a bolt head having a bolt head axis, a plurality of locking lugs, and a cam pin; where the bolt head defines at least two recesses between at least two adjacent locking lugs, the at least two recesses having a recess radius as measured with respect to the bolt head axis; the bolt head defines at least two centering ramps formed in a region of the at least two recesses so that the centering ramps extend obliquely to the bolt head axis and extend in an axial direction toward a rear of the bolt head up to a central radius that is greater than the recess radius, such that the at least two centering ramps aid in a self-centering of the bolt head during a locking process; and the cam pin includes at least one step at an end to be inserted into the bolt head.

BRIEF DESCRIPTION OF THE DRAWINGS

The present disclosure will be explained in more detail below with reference to the drawings, in which.

DETAILED DESCRIPTION

According to the present disclosure, the problems that characterized prior art bolt heads are solved by a bolt head according to the present disclosure, in particular a bolt head having at least two centering ramps projecting obliquely toward the rear for self-centering the bolt head when it is moved in and out of the locking space of a barrel/cartridge chamber. Self-centering can help to obviate premature wear and material fatigue. Furthermore, the reloading process is smoother and freer of disturbances with such a bolt head.

In one embodiment, at least one alignment surface can be located on the bolt head directly in the region axially adjoining the locking lugs, which alignment surface functionally interacts with a counter-surface in the locking space, as a result of which the movement of the bolt head is further smoothed because it is provided with better guidance.

In another embodiment, the bolt head can have locking lugs provided with rounded portions and chamfers, as a result of which the stress applied to the bolt head is further reduced.

In yet another embodiment, the cam pin of the bolt head can have a stepped taper at its end, and the bolt head can have a corresponding shape-complementary, stepped bore for receiving the end of the cam pin, resulting in improved torque absorption. In the context of the present disclosure, the meaning of "shape-complementary" indicates that a geometrical shape of a second object ("shape-negative") is chosen in order to fit roughly to the geometrical shape of a first object ("shape-positive"), which interact with each other. An example for "shape-complementary" could be the "key-lock" principle.

In another embodiment, the bolt carrier associated with the bolt head can have additional front and rear alignment surfaces to secure it against any tilting movement.

A comparison of different, preferred embodiments with the prior art results in the following advantages:
- self-centering
- low-friction sliding in and out of the bolt head
- minimally malfunction-prone reloading process
- smoother behavior of the weapon
- higher mechanical stability of the cam pin
- improved service life Above all, the solution according to the present disclosure allows a prolonged service life of the bolt head. It has been recognized that the self-centering design helps to reduce premature wear of material and fatigue because the bolt head is smoothly guided into and out of the locking space without disturbing impacting or striking caused by acentric movement. It has been found to be particularly advantageous if the locking sleeve is provided with counter-surfaces to the centering ramps on the bolt head. Such counter-surfaces are described in EP19201453.8. In the following context, these counter-surfaces are also referred to as counter-ramps.

The specially-shaped front and rear alignment surfaces on the bolt carrier achieve additional stabilization of the bolt carrier as it moves in the receiver during the loading process and reduces premature wear and material fatigue, and in particular the bolt head is also stabilized using the bolt carrier.

Preferably, chamfers are formed on the cartridge guides to prevent the cartridge guides from slipping off the cartridge bottom during the loading process, as is possible on curves. This can avoid feed jams and reduces the corresponding shocks and impacts on the bolt head. Likewise, a misaligned movement of the bolt head occurring during a jam can be significantly reduced, which in turn has a positive effect on premature wear and material fatigue.

A further aspect of the present disclosure relates to the special and novel stepped design of the cam pin and the shape-complementary bore in the bolt head. The taper at the end of the cam pin is accompanied by an increased wall thickness of the bolt head in the region of the cam pin, which, drastically reduces the susceptibility to material fatigue and fractures in this region. In addition, any occurring transverse forces are additionally absorbed by the bolt head via the additionally created side surface in cooperation with the additionally created support surface, and sufficient torque absorption is ensured.

In the context of the present disclosure, the locking lugs on the barrel/cartridge chamber or the locking sleeve are fixed in position, whereas the locking lugs on the bolt head can be moved relative to the locking lugs of the locking sleeve.

Figure 1:
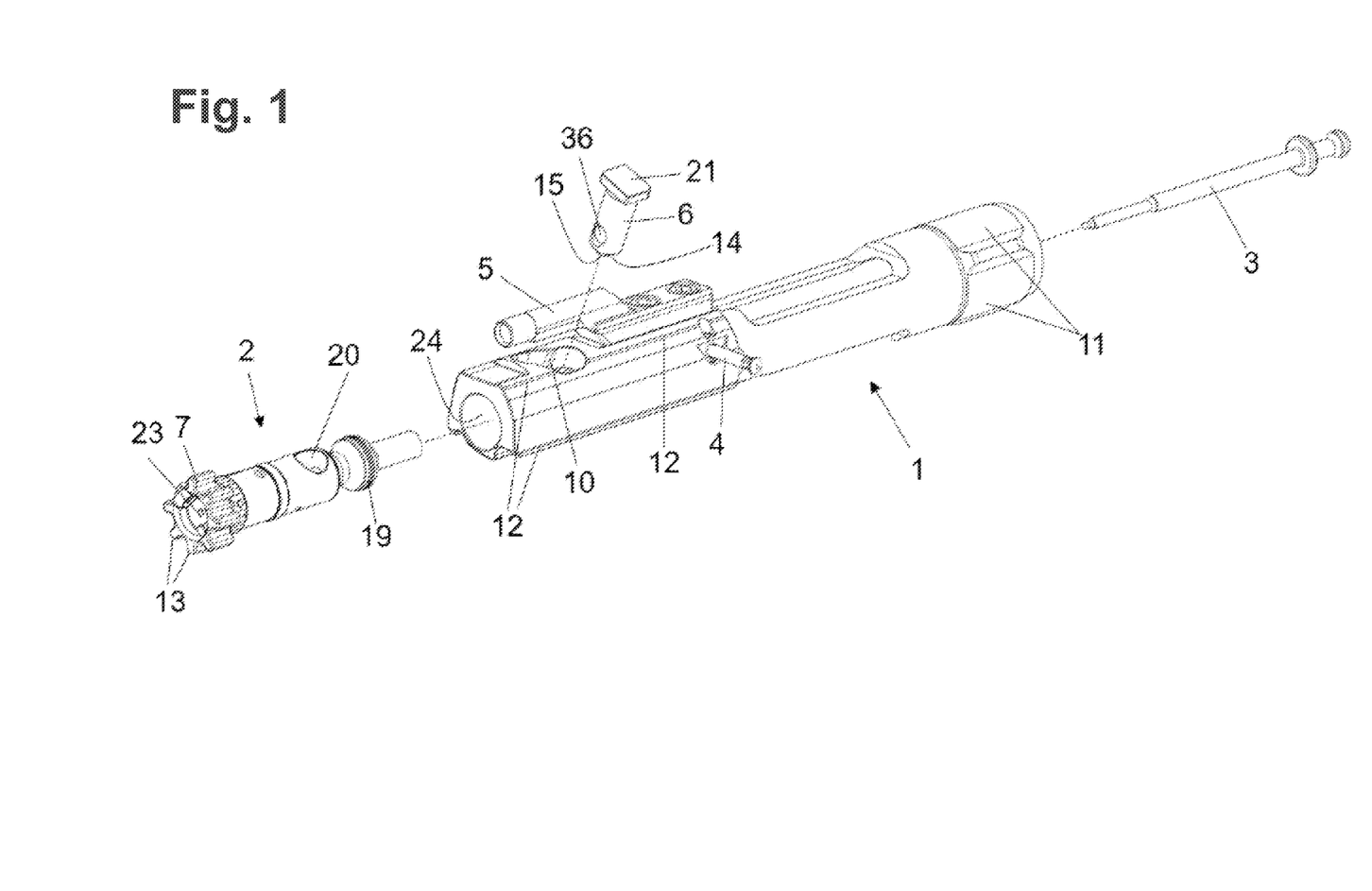
FIG. 1 is a perspective exploded view of an illustrative bolt arrangement according to the present disclosure.
Figure 7:
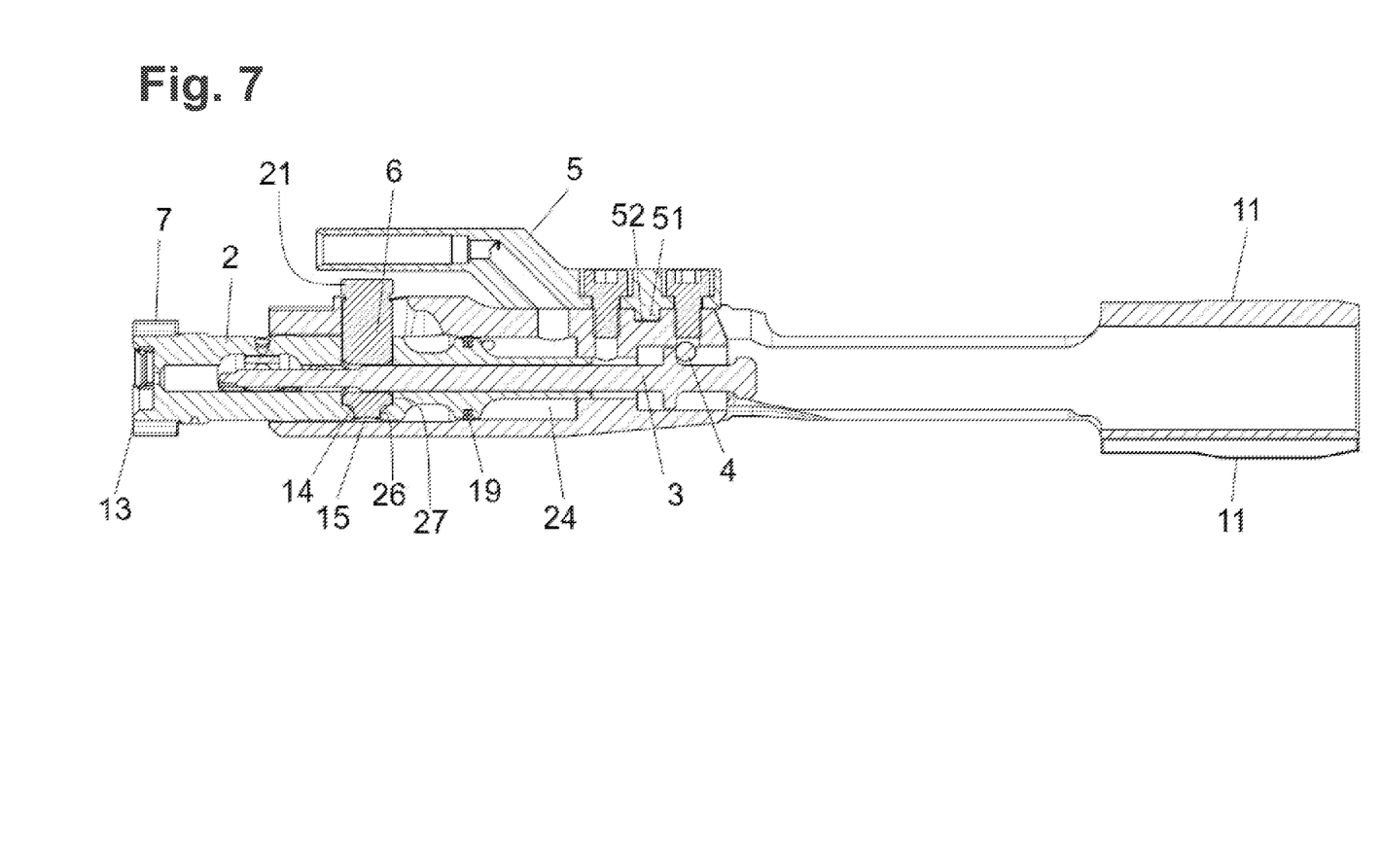
FIG. 7 shows a longitudinal section of the bolt carrier of FIG. 1

FIG. 1 and FIG. 7 show a bolt system having a bolt carrier 1, a bolt head 2 and a firing pin 3 in an exploded view. In the illustrated embodiment, a bolt for direct gas operation, as can be used for example in firearms of the M4/M16/AR-15 series, the gas deflecting piece, hereinafter referred to as gas key 5, is arranged on the bolt carrier 1. The bolt head 2 having gas rings 19, a cam pin bore 20, locking lugs 7 and a firing pin bore 23 is, in the installed state, located in the bolt head bore 24 of the bolt carrier 1, and the firing pin 3 is located in the firing pin bore 23 and is prevented from falling out by the retaining pin 4. The cam pin 6 having a head 21, which runs in a corresponding groove in the receiver to obviate a premature locking movement or any rotation that could hinder the firing pin, having a step 14 and an end 15 extends through a cam 10 that is provided in the bolt carrier 1 and is located in the bore 20 of the bolt head 2. Said cam pin 6 is held in position by the firing pin 3, which passes through the firing pin through hole 36, and the head 21 protrudes beyond the bolt carrier 1.

In the case of axial movement of the bolt head 2 relative to the bolt carrier 1, a rotating movement of the bolt head 2 is effected and limited by the interaction of the cam pin 6 and the cam 10. Furthermore, this limits the axial movement of the bolt head 2 relative to the bolt carrier 1.

The firearm is loaded by means of an axial movement of the bolt carrier 1 in the receiver in the firing direction (to the left in FIG. 1). The bolt head 2 movably mounted in the bolt carrier 1 takes along an uppermost cartridge (not shown) from a magazine (not shown) in that the bolt locking lugs 7 facing the magazine and located at the bottom in the installation situation having cartridge guides 13 formed on them push the cartridge on the cartridge bottom across the loading ramps (not shown) and into the cartridge chamber 46 (shown in FIG. 8) substantially parallel to barrel bore axis and in the direction of the muzzle.

After the bolt head 2 has completed the forward movement and has reached its final position with the bolt locking lugs 7 in the locking space 44 (FIG. 8) of the locking sleeve 45 (FIG. 8), the bolt carrier 1 continues to push forward, causing a relative movement with respect to the already stationary bolt head 2. Due to the interaction of cam 10 and the cam pin 6, the bolt head 2 performs a forced rotational movement. As a result, the bolt locking lugs 7 engage behind the sleeve locking lugs 43 (shown in FIG. 8) of the locking sleeve 45 of a barrel 48 having a cartridge chamber 46, and the bolt is thus locked. The firearm is in the loaded state.

The bolt carrier 1 movably mounted in the upper receiver has at least one front alignment surface 12 and at least one rear alignment surface 11, which alignment surfaces rest against the upper receiver and allow and stabilize the axial alignment and movement of the bolt carrier 1 within the upper receiver. Said alignment surfaces counteract the so-called "carrier tilt" or "catching" of the bolt carrier in the rear region, which is caused by the bolt carrier's own weight and by acentric movements such as oscillations, shaking, vibrations and/or other influences. This stabilization of the bolt carrier 1 in the receiver also stabilizes the bolt head 2 with respect to acentric (transverse) movements, which bolt head is freely movable in the axial and tangential (circumferential) direction in the bolt carrier 1.

More preferably, a plurality of front and/or rear alignment surfaces 11, 12 are provided, which alignment surfaces are distributed in the circumferential direction like a "balancing weight" such that the barrel properties are stabilized. Compared with the prior art, this stabilization can reduce malfunctions and fosters low-friction movement during the loading process and during the corresponding insertion and removal of the bolt head 2 from the locking chamber 44 of the locking sleeve 45 (also often referred to as barrel extension) and thus increases the service life of the bolt head 2. Both premature wear of the locking lugs 7 due to acentric insertion into the locking space 44 (see FIG. 8) and impacts on the locking lugs 7 caused by this can be significantly reduced, and the relatively thin wall region of the bolt head 2 around the cam pin 6 can be more effectively saved from damage (because fewer unintentional transverse forces are exerted and, as a result, only a small torque from the cam pin 6 acts on the bolt head 2).

In a particular embodiment, the longitudinal extensions of the front and/or rear alignment surfaces 11, 12 can be formed differently from each other, wherein such a distribution of the bearing surfaces also results in an optimization of the center of mass of the bolt carrier. This can be easily seen when viewing FIGS. 1 and 7 together. It should be explicitly mentioned at this point that, according to the present disclosure, a different length of the rear alignment surfaces 11 in the circumferential direction can be formed. This measure allows the barrel properties to be adjusted in a targeted manner, which is easy for those skilled in the art to determine with a small number of attempts.

Figure 2:
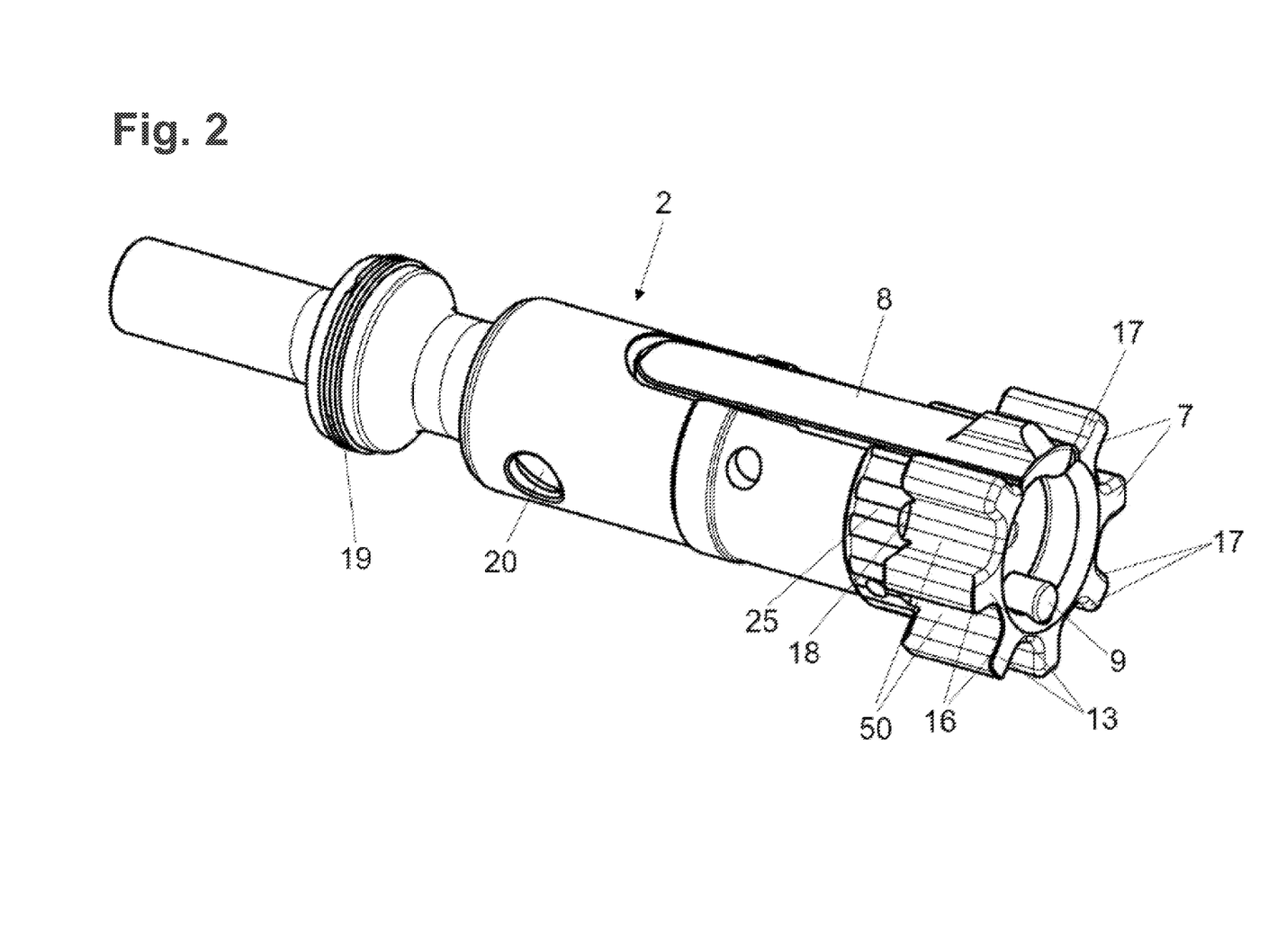
FIG. 2 is a perspective view of the bolt head of FIG. 1.

FIG. 2 is a perspective view showing a possible embodiment according to the present disclosure of a bolt head 2 obliquely from below/in front. As in the prior art, the bolt head comprises an extractor 8 and an ejector 9. The lower side of the bore 20 for receiving the cam pin 6 is also shown. A recess 50 is formed between two (adjacent) locking lugs 7. The bolt locking lugs 7 are provided with rounded portions 17 for the smoothest possible sliding in and out of the locking space 44. The rounded portions 17 (in the illustration they appear as large chamfers, but they are actually rounded portions) reduce unwanted catching of the bolt head 2 when it is inserted into the locking space 44 at the lugs thereof because the rounded portions 17 facilitate sliding on edges, etc.

In the region of the cartridge guides 13 facing the magazine that is not shown, the rounded portions facing the cartridge to be introduced are replaced by chamfers 16, which prevents possible slippage of the cartridge guides 13 from the cartridge during the loading process and thus achieves easier and more trouble-free loading than in the prior art.

Figure 8:
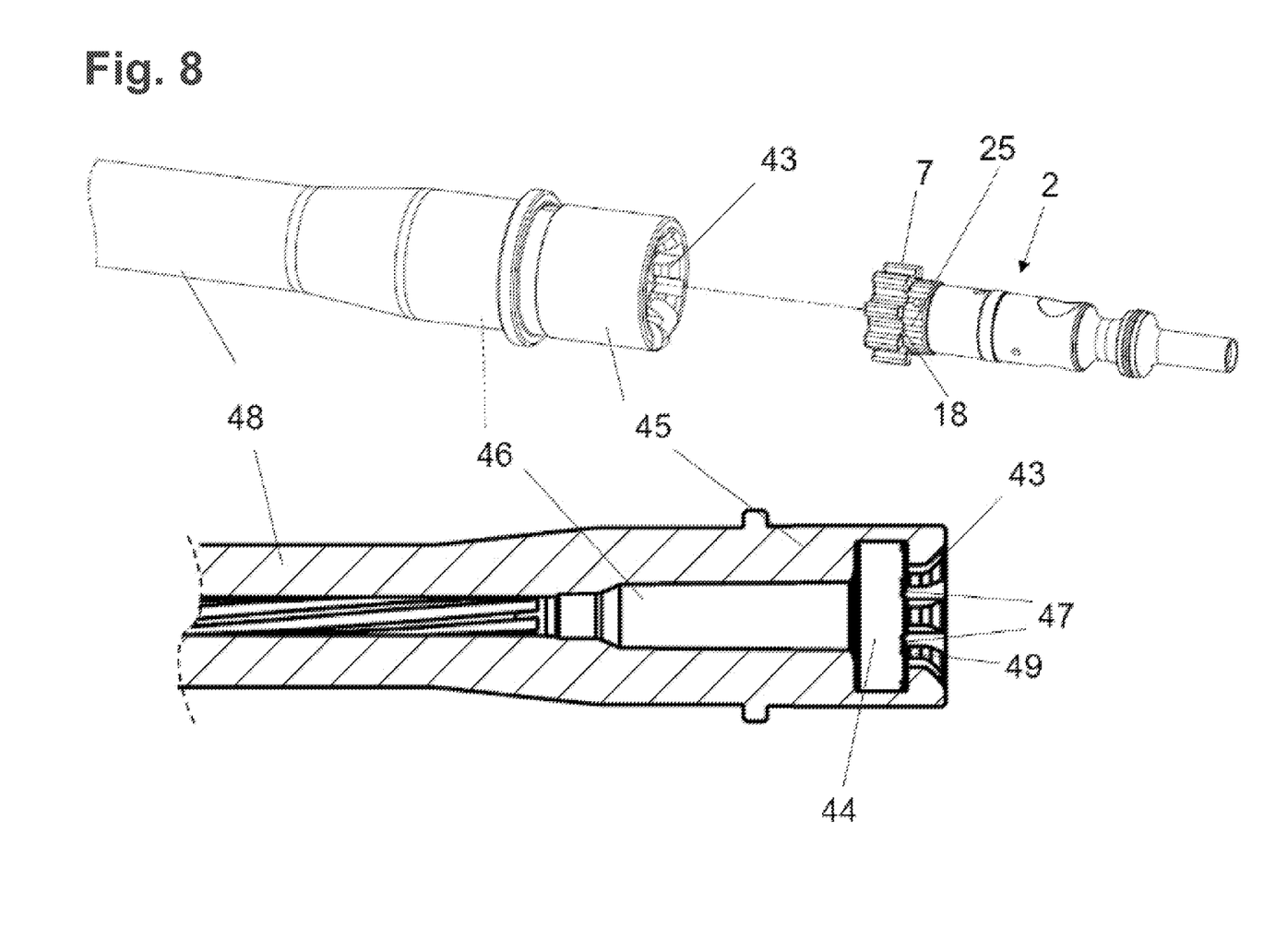
FIG. 8 shows the bolt head with the locking sleeve of a barrel/cartridge bearing.

The alignment surface 25, which is located behind and directly after the locking lugs 7 and/or recesses 50 as viewed in the axial direction and has the radius r2 34 (FIG. 4), forms a counter-surface to the transverse surface portions, in short transverse surfaces 49, of the locking lugs 43 of the locking sleeve 45 of the barrel 48 (FIG. 8). The alignment surfaces 25 thus act as additional alignment surfaces for the bolt head 2 in the locking space 44. The alignment surface 25 can, as shown in FIG. 5F, be designed to be annular and continuous or to have interruptions, as shown, for example, in FIGS. 5A-5E.

The centering ramp 18 provided according to the present disclosure is formed as an oblique transition between the recesses 50, between two locking lugs 7, and the adjacent alignment surface 25, as can be seen in particular in FIGS. 5A-5F. The centering ramps 18 automatically center the bolt head 2 during insertion into the locking space 44 of a barrel 48, as a result of which premature wear and material-stressing knocks and impacts are avoided, thus increasing the service life.

Influences occurring in the field or during automatic firing, such as contaminations, oscillations, shaking, vibrations, and the like, can lead to an acentric movement of the bolt head 2. By means of the centering ramps 18, these acentric movements are avoided and the bolt head 2 is automatically centered, as a result of which possible jams and premature wear are avoided and a corresponding increase in the service life is achieved. This automatic centering is done particularly well by the centering ramps 18 according to the present disclosure in a combination of the bolt head 2 and a firearm that has corresponding counter-surfaces in the locking sleeve 44 that are complementary to the centering ramps 18 in terms of shape and function. Such counter-surfaces in a locking sleeve of a firearm are described in EP19201453.8, which was mentioned above, and are shown as counter-ramp 47 in FIG. 8.

Figure 3:
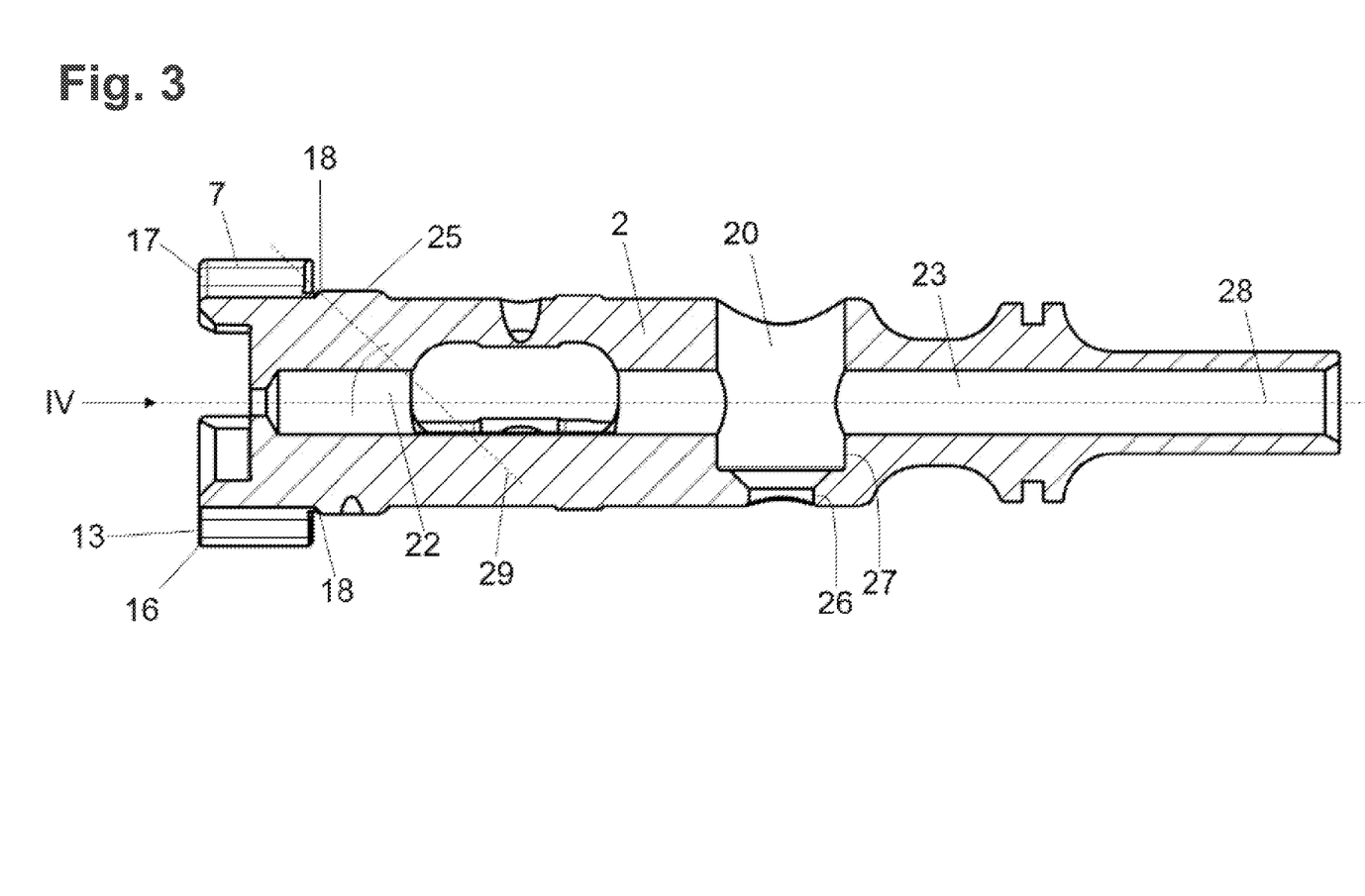
FIG. 3 shows a longitudinal section of the bolt head of FIG. 2.

A longitudinal section of an embodiment of the bolt head 2 is shown in FIG. 3. The angle α designated by 22 is defined by the surface normal 29 of the centering ramp 18 and by the bolt head axis 28. The following applies in this case: $5°<\alpha<85°$, preferably $15°\leq\alpha\leq65°$, and particularly preferably $25°\leq\alpha\leq50°$.

Figure 4:
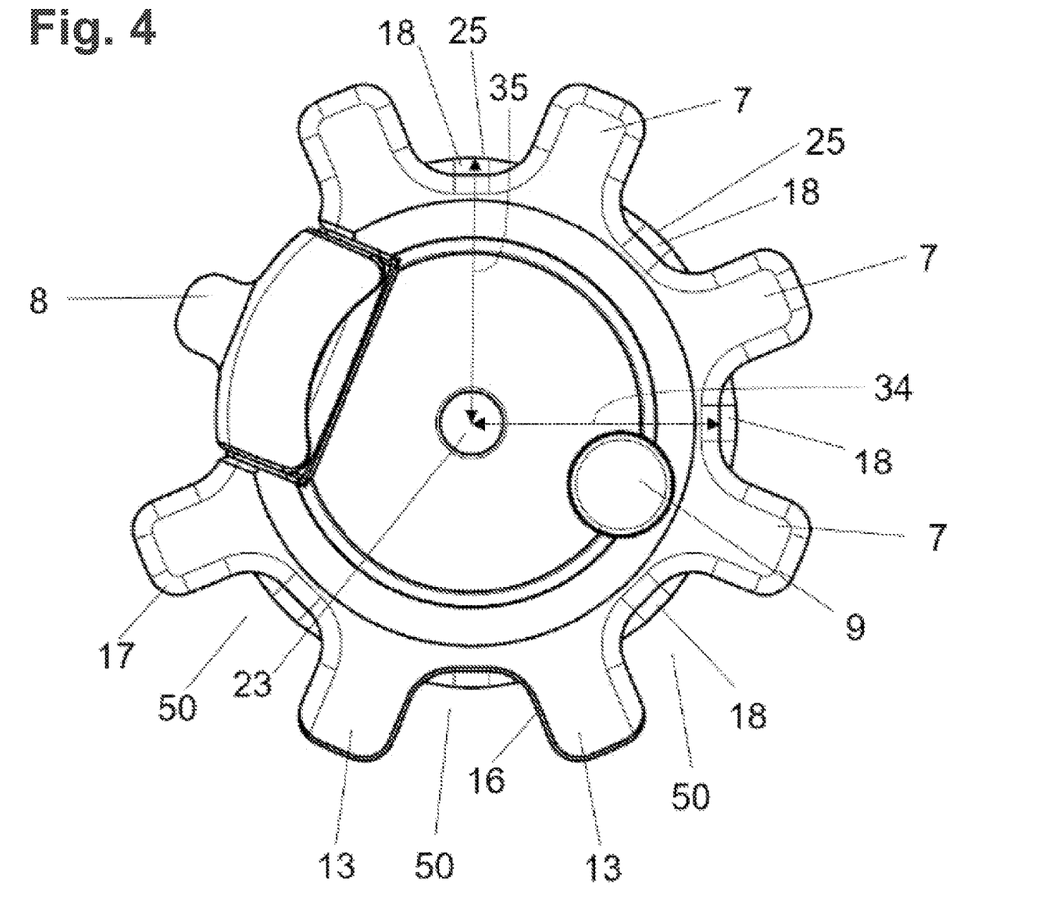
FIG. 4 is a view in the direction of the arrow IV of FIG. 3, FIGS. 5A-5F are detailed views of illustrative variants of the bolt head in views comparable to that of FIG. 4.

FIG. 4 shows the bolt head 2 according to the present disclosure in a view in the direction of the bolt head axis 28 or of the arrow IV of FIG. 3. The chamfer 16 on the cartridge guides 13 has an angle of 30° to 60°, preferably an angle of 40° to 50° with respect to the normal plane to the bolt head axis 28. The width of the chamfer 16 is within the range of 0.05 mm to 0.2 mm, preferably 0.08 mm to 0.12 mm. The radius of the rounding portion 17 on the locking lugs 7 is within the range of 0.2 mm to 2 mm, preferably within the range of 0.3 mm to 1 mm.

Figure 5A:
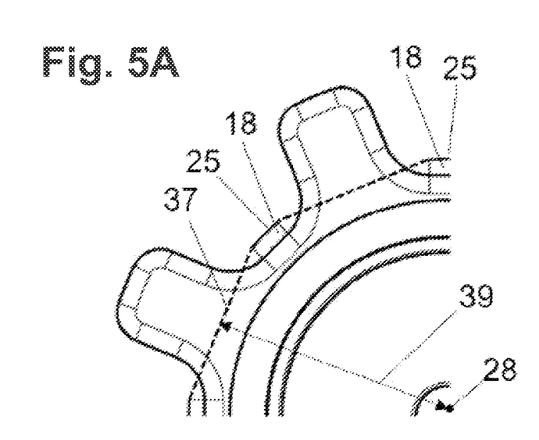

FIGS. 5A-5E are partial detailed views analogous to FIG. 4, wherein, by means of dashed lines, different embodiments of interruptions of the alignment surface 25 extending parallel to the bolt head axis 28 are shown. Such interruptions can be formed, for example, as one or a plurality of flattened portions 37 or as one or a plurality of trench-forming alignment surface recesses 38. "Trench-forming" is used for illustrative and visualization purposes and refers to the embodiment of FIG. 5B. FIG. 5A shows an embodiment having, in each case, one flattened portion 37 between the alignment surfaces 25 located directly after the respective centering ramps 18. The normal distance N1, designated by 39, is the shortest distance between the bolt head axis 28 and the flattened portion 37, which distance is formed by a normal. The normal distance N1 39 is smaller than the radius r2 designated by 35.

Figure 5B:
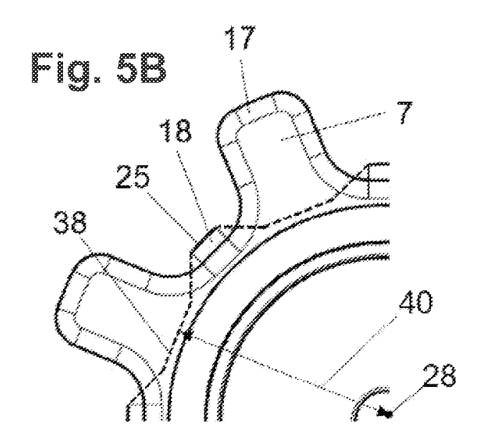

FIG. 5B shows an embodiment having, in each case, one recess or trench-forming recess 38 as an interruption between the alignment surfaces 25 located adjacent to the respective centering ramps 18. The normal distance N2, designated by 40, is the shortest distance between the bolt head axis 28 and recess 38, which distance is formed by a normal. The normal distance N2 40 is smaller than the radius r2 35.

Figure 5C:
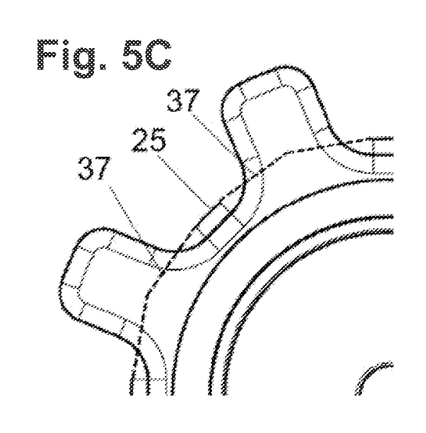
Figure 5D:
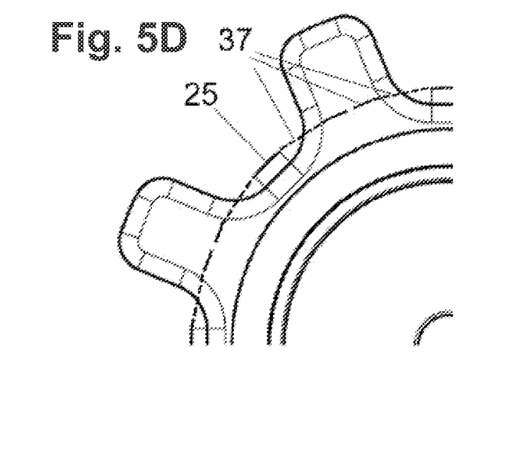
Figure 5E:
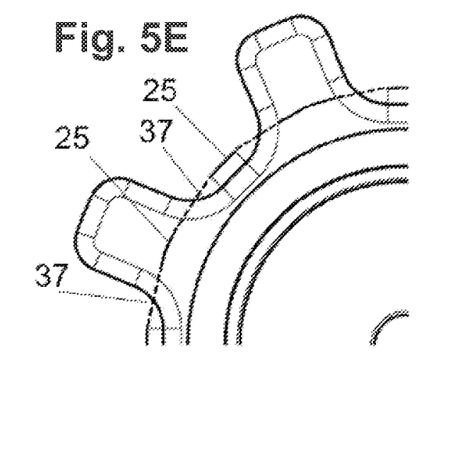
Figure 5F:
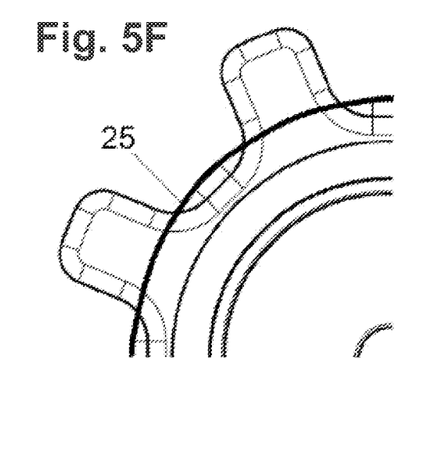

FIGS. 5C, 5D show variants having two or three directly adjacent flattened portions 37 between the alignment surfaces 25 located after the respective centering ramps 18. FIG. 5E, in turn, shows a preferred variant with a flattened portion 37 between two alignment surfaces 25, wherein one of these two alignment surfaces 25 is located after the respective centering ramps 18, and the other alignment surface 25 is located behind a respective locking lug 7 as viewed in the axial direction.

FIG. 5F is a detailed view of a continuous alignment surface that is annularly formed around the bolt head 2 without interruption.

The present disclosure is not limited to the interruptions shown in FIGS. 5A-5F, but also extends to other embodiments such as semi-cylindrical or concave recesses or bionic surfaces and other types of surfaces conventionally used in additive design and manufacturing.

The interruptions of the alignment surface 25 act advantageously to reduce the friction between the parts that are moved during the locking process and thus allow easier and smoother locking and unlocking of the bolt, thus premature material wear and correspondingly can be reduced extending the service life, even in unfavorable conditions such as under-lubrication or dust and dirt contamination that occurs during field use.

Figure 6:
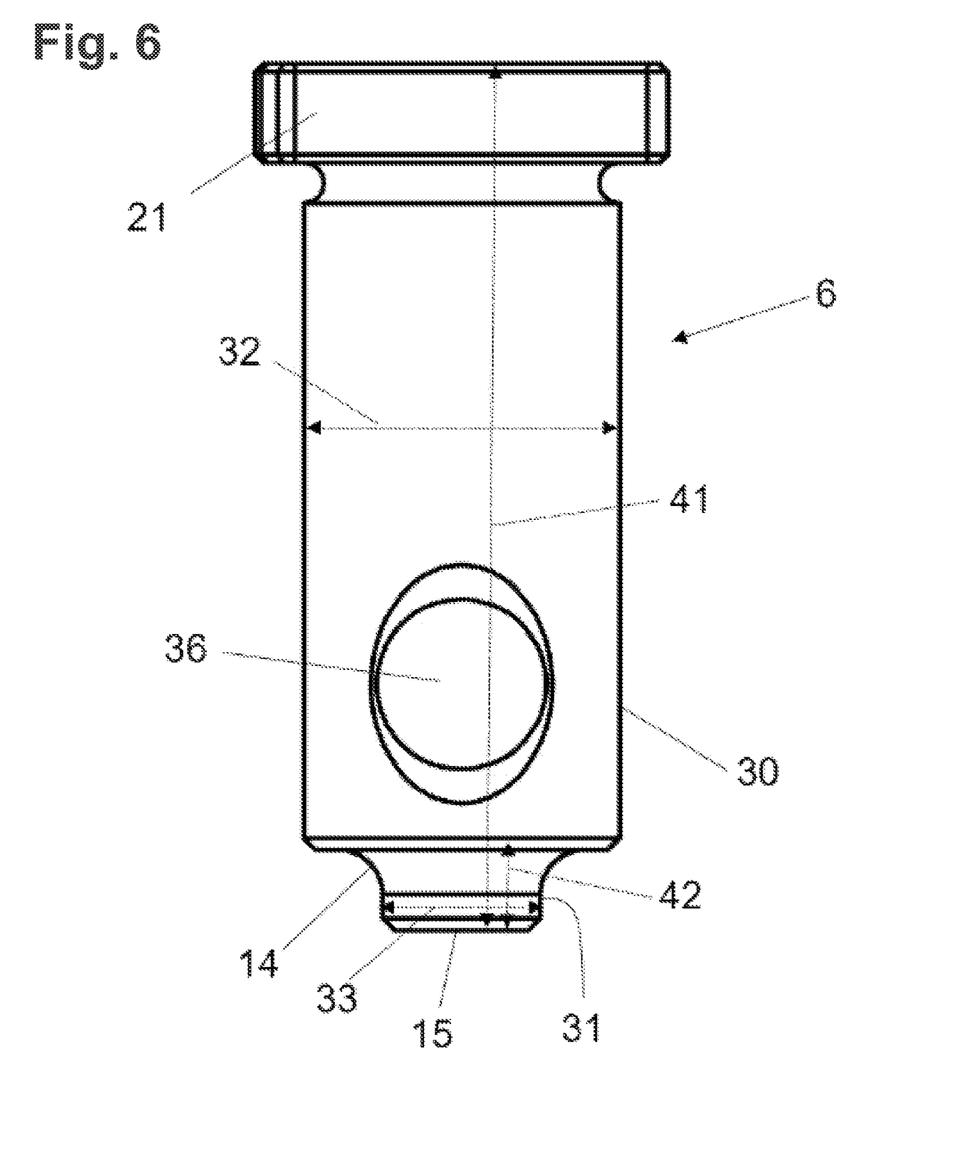
FIG. 6 is a schematic view of an illustrative cam pin according to the present disclosure.

FIG. 6 is a schematic view of the substantially rotationally symmetric cam pin 6 according to the present disclosure having a stepped design, a head 21, a firing pin through hole 36, an end 15, a step 14, an outer surface 30, and an additional side surface 31 formed by the stepped shape. The length L2, designated by 42, of the tapered and stepped end 15 of the cam pin 6 corresponds to a minimum of 0.05 to a maximum of 0.5 times the total length L1 of the cam pin 6, designated by 41. Preferably, the length L2 is within the range of 0.1 to 0.3 times the total length L1 of the cam pin 6. The diameter D2, designated by 33, of the tapered and stepped end 15 of the cam pin corresponds to a minimum of ⅕ and a maximum of ⅘ of the diameter D1, designated by 32, of the cam pin. Preferably, the diameter D2 is within the range of ⅓ to ⅔ of the diameter D1. The ideal ratio L2/L1 and D2/D1 can easily be determined by those skilled in the art as a function of the bolt head dimensions. In addition to the single-step shape shown, multi-step embodiments of the end 15 are also possible.

FIG. 7 shows a longitudinal section of a bolt carrier 1 having a bolt head 2 and a cam pin 6. The cam pin 6 comprises a head 21 and one or a plurality of steps 14 at its end 15. The bore 20 of the bolt head 2 is accordingly complementary in shape and design to the lower part of the cam pin 6 and receives most of the cam pin 6. The stepped and tapered configuration of the end 15 of the cam pin 6 creates the additional (cylindrical) side surface 31 parallel to the axis of the cam pin 6. At the same time, the shape-complementary design of the bore 20 creates a taper toward its end and entails corresponding greater wall thicknesses of the bolt head 2 at precisely this end. Thus, the bolt head 2 according to the present disclosure has more material in the region of the end of the bore 20 than in the prior art, and fatigue fractures of the bolt head 2 in the region of the cam pin can be prevented. Furthermore, the bolt head 2 having bore 20 that is shape-complementary to the step-shaped cam pin 6 absorbs the additional transverse forces acting on the cam pin 6. These transverse forces, caused for example by the movement along the sliding guide and/or by vibration, shaking, oscillations, etc., are transmitted onto the support surface 27 and the additional support surface 26 of the bolt head 2 through the side surface 30 and the additional side surface 31 of the cam pin 6 (FIG. 6) (parallel to the longitudinal axis of the bore 20, also seen in FIG. 3) and absorbed by the bolt head 2.

In the illustrated embodiment, the gas key 5 is fastened on the bolt carrier 1 using two screws. During the gas-pressure-induced reloading process, gas is passed into the bolt carrier 1 via the gas key 5. Due to the high gas pressure suddenly arising upon firing, corresponding forces occur at the gas key, which forces are relayed to the bolt carrier via the screw connection.

For better transmission of the force from the gas key 5 to the bolt carrier 1, a nose 51 is formed on the gas key 5, which nose engages in a shape-complementary catch 52 of the bolt carrier 1. Surprisingly, it has been found that this additional possibility of force transmission and force dissipation causes the screw connection of the gas key 5 to the bolt carrier 1 to be subjected to less stress, thereby preventing loosening of the screw connection during use. A gas key that is permanently loose during use promotes, in addition to potential, unwanted gas leakage at the wrong place, namely between the gas key 5 and the bolt carrier 1, an acentric movement of the bolt carrier 1 and thus of the bolt head 2 by shifting the center of gravity. Because of the described additional possibility of force transmission from nose 51 to detent 52, preventing acentric movement of the bolt carrier 1 and the bolt head 2 can ultimately extend the service life of the bolt head 2.

FIG. 8 is perspective view of a barrel 48 having a cartridge chamber 46, a locking sleeve 45 and a locking space 44 and of a bolt head 2, and the barrel is also shown in axial section. The locking lugs 43 of the locking sleeve 45 have transverse surfaces 49 that guide the bolt head 2 during insertion into the locking space 44 and act as counter-surfaces to the alignment surfaces 25 in the inserted state. The counter-ramps 47 are complementary to the centering ramps 18 in terms of shape and function and support the self-centering of the bolt head 2 during insertion into the locking space 44. If the bolt is in the closed state, the locking lugs 7 of the bolt head 2 are in the locking space 44 of the barrel 48, and the transverse surfaces 49 of the locking lugs 43 of the locking sleeve 44 rest on the alignment surfaces 25.

The present disclosure is not limited to the embodiments shown, but also includes other bolt system variants such as gas piston systems and others. For the purposes of the present disclosure, the cam pin 6 is to be understood as a part of the bolt head 2.

The bolt head 2 according to the present disclosure can be produced, for example, by means of machining processes such as milling, turning or grinding. The bolt head 2 according to the present disclosure can also be produced using forming processes such as forging or hammering, powder metallurgy or metal injection molding (MIM), or else by means of additive manufacturing processes such as 3D printing or a combination of these methods.

All the materials used for the mentioned components in the prior art can also be used for the components designed according to the present disclosure.

The various embodiments described can be combined with each other arbitrarily, thereby also making the explained embodiment of the cam pin 6 advantageously possible in bolt heads without centering ramps 18, as well as the use of the front and rear alignment surfaces, which also do not depend on the embodiment of the bolt head. This also applies to the alignment surfaces 25 and the other characteristics and features described.

| List of reference numerals: | |
|---|---|
| 1 | Bolt carrier |
| 2 | Bolt head |
| 3 | Firing pin |
| 4 | Retaining pin |
| 5 | Gas key |
| 6 | Cam pin |
| 7 | Bolt locking lugs |
| 8 | Extractor |
| 9 | Ejector |
| 10 | Cam |
| 11 | Rear alignment surface |
| 12 | Front alignment surface |
| 13 | Cartridge guide |
| 14 | Step |
| 15 | End |
| 16 | Chamfer |
| 17 | Rounded portion |
| 18 | Centering ramp |
| 19 | Gas ring |
| 20 | Bore |
| 21 | Head |
| 22 | Angle |
| 23 | Firing pin bore |
| 24 | Bolt head bore |
| 25 | Alignment surface |
| 26 | Additional support surface |

| List of reference numerals: | |
|---|---|
| 27 | Support surface |
| 28 | Bolt head axis |
| 29 | Surface normal |
| 30 | Outer surface |
| 31 | Additional side surface |
| 32 | Diameter D1 |
| 33 | Diameter D2 |
| 34 | Radius r1 |
| 35 | Radius r2 |
| 36 | Firing pin through hole |
| 37 | Flattened portion |
| 38 | Alignment surface recess |
| 39 | Normal distance N1 |
| 40 | Normal distance N2 |
| 41 | Length L1 |
| 42 | Length L2 |
| 43 | Sleeve locking lugs |
| 44 | Locking space |
| 45 | Locking sleeve |
| 46 | Cartridge chamber |
| 47 | Counter-ramps |
| 48 | Barrel |
| 49 | Transverse surface |
| 50 | Recess (between locking lugs) |
| 51 | Nose |
| 52 | Detent |

The invention claimed is:

1. A bolt head for a firearm having a bolt head axis and a plurality of locking lugs, the bolt head defining at least two recesses between at least two adjacent locking lugs, the at least two recesses having a recess radius as measured with respect to the bolt head axis;
wherein the bolt head defines at least two centering ramps formed in a region of the at least two recesses so that the centering ramps extend obliquely to the bolt head axis and extend in an axial direction toward a rear of the bolt head up to a central radius that is greater than the recess radius, such that the at least two centering ramps aid in a self-centering of the bolt head during a locking process; and
wherein at least one alignment surface forms a continuous ring around the bolt head; or the at least one alignment surface is interrupted by a plurality of flattened portions, with each flattened portion extending along a tangent of the bolt head axis.

2. The bolt head according to claim 1, wherein each centering ramp extends obliquely to the bolt head axis at an angle α as measured between a surface normal to the centering ramp and the bolt head axis; and wherein $5° < α < 85°$.

3. The bolt head according to claim 1, wherein each centering ramp extends obliquely to the bolt head axis at an angle α as measured between a surface normal to the centering ramp and the bolt head axis; and wherein $15° ≤ α ≤ 65°$.

4. The bolt head according to claim 1, wherein the at least one alignment surface has a radius r2 measured with respect to the bolt head axis, the at least one alignment surface being immediately rearward of the centering ramps as viewed axially.

5. The bolt head according to claim 4, wherein a normal distance N1 from the flattened portions to the bolt head axis is smaller than the radius r2.

6. The bolt head according to claim 4, wherein the at least one alignment surface is interrupted by a plurality of alignment surface recesses.

7. The bolt head according to claim 6, wherein a normal distance N2 from the alignment surface recesses to the bolt head axis is smaller than the radius r2.

8. The bolt head according to claim 1, wherein the locking lugs disposed at a bottom of the bolt head to face a magazine of the firearm include cartridge guides, and additionally include chamfers along their front edges in the region of the cartridge guides.

9. The bolt head according to claim 8, wherein the locking lugs have rounded portions at their edges outside a region of the cartridge guides; and the locking lugs have chamfers along at least their inner edges in the region of the cartridge guides.

10. The bolt head according to claim 9, wherein the locking lugs additionally have chamfers along their outside edges in the region of the cartridge guides.

11. The bolt head according to claim 9, wherein the locking lugs additionally have chamfers along their rear edges in the region of the cartridge guides.

12. The bolt head according to claim 9, wherein a radius of the rounded portions of the locking lugs is within a range of 0.2 to 2 mm.

13. The bolt head according to claim 9, wherein a radius of the rounded portions of the locking lugs is within a range of 0.3 to 1 mm.

14. The bolt head according to claim 9, wherein a width of the chamfers is within a range of 0.05 mm to 0.2 mm.

15. The bolt head according to claim 9, wherein a width of the chamfers is within a range of 0.08 mm to 0.12 mm.

16. The bolt head according to claim 9, wherein an angle of the chamfers is within a range of 30° to 60° with respect to a plane normal to the bolt head axis.

17. The bolt head according to claim 9, wherein an angle of the chamfers is within a range of 40° to 50° with respect to a plane normal to the bolt head axis.

18. A method for manufacturing a bolt head according to claim 1, wherein the method includes one or more machining processes selected from milling, turning, and grinding; one or more forming processes selected from forging, hammering, powder metallurgy, and metal injection molding; one or more additive manufacturing processes; or any combination thereof.

19. A bolt carrier for a firearm, comprising:
a bolt head having a bolt head axis, a plurality of locking lugs, and a cam pin; wherein
the bolt head defines at least two recesses between at least two adjacent locking lugs, the at least two recesses having a recess radius as measured with respect to the bolt head axis;
the bolt head defines at least two centering ramps formed in a region of the at least two recesses so that the centering ramps extend obliquely to the bolt head axis and extend in an axial direction toward a rear of the bolt head up to a central radius that is greater than the recess radius, such that the at least two centering ramps aid in a self-centering of the bolt head during a locking process; and
the bolt head defines a cam pin bore transverse to the bolt head axis that is configured to receive the cam pin;
wherein the cam pin has a tapered end to be inserted into the cam pin bore of the bolt head; the tapered end of the cam pin includes at least one step; and the cam pin bore is shape-complementary to the tapered end of the cam pin.

20. The bolt carrier according to claim 19, wherein the cam pin has a diameter D1, and a diameter D2 at the stepped and tapered end to be inserted into the bolt head; where D2 is smaller than D1 and $$\frac{1}{5} \leq \frac{D2}{D1} \leq \frac{4}{5}.$$

21. The bolt carrier according to claim 20, wherein the cam pin has a total length L1 and the stepped and tapered end diameter D2 has a length L2, where L2 is within a range of 0.05 to 0.5 times L1.

22. The bolt carrier according to claim 20, wherein the cam pin has a total length L1 and the stepped and tapered end diameter D2 has a length L2, where L2 is within a range of 0.1 to 0.3 times L1.

23. The bolt carrier according to claim 19, wherein the bolt carrier includes a surface that defines a detent, where the detent is configured to cooperate with a shape-complementary nose of a gas key.

24. The bolt carrier according to claim 19, wherein the bolt carrier includes at least one front alignment surface and at least one rear alignment surface on a surface of the bolt carrier, where the at least one front alignment surface and the at least one rear alignment surface are configured to operatively contact a receiver of the firearm.

25. A firearm comprising a bolt carrier, wherein the bolt carrier includes:

a bolt head having a bolt head axis, a plurality of locking lugs, and a cam pin; wherein the bolt head defines at least two recesses between at least two adjacent locking lugs, the at least two recesses having a recess radius as measured with respect to the bolt head axis;

the bolt head defines at least two centering ramps formed in a region of the at least two recesses so that the centering ramps extend obliquely to the bolt head axis and extend in an axial direction toward a rear of the bolt head up to a central radius that is greater than the recess radius, such that the at least two centering ramps aid in a self-centering of the bolt head during a locking process; and the bolt head defines a cam pin bore transverse to the bolt head axis that is configured to receive the cam pin;

wherein the cam pin has a tapered end to be inserted into the cam pin bore of the bolt head; the tapered end of the cam pin includes at least one step; and the cam pin bore is shape-complementary to the tapered end of the cam pin.

26. The firearm according to claim 25, wherein a barrel of the firearm includes a locking sleeve having obliquely formed counter-ramps that are complementary to the centering ramps and configured to cooperate with the centering ramps in a functionally complementary manner during a locking process.

* * * * *